US009699508B2

United States Patent
Shin et al.

(10) Patent No.: US 9,699,508 B2
(45) Date of Patent: Jul. 4, 2017

(54) DISPLAY APPARATUS HAVING VIRTUAL MACHINE AND METHOD OF CONTROLLING THE SAME

(75) Inventors: Byungseon Shin, Seoul (KR); Soomook Moon, Seoul (KR); Dongheon Jung, Seoul (KR); Sukwon Park, Seoul (KR)

(73) Assignees: LG Electronics Inc., Seoul (KR); SNU R&DB Foundation, Seoul (KR)

( * ) Notice: Subject to any disclaimer, the term of this patent is extended or adjusted under 35 U.S.C. 154(b) by 136 days.

(21) Appl. No.: 13/451,356

(22) Filed: Apr. 19, 2012

(65) Prior Publication Data

US 2012/0278805 A1 Nov. 1, 2012

Related U.S. Application Data

(60) Provisional application No. 61/477,582, filed on Apr. 20, 2011.

(30) Foreign Application Priority Data

Jun. 16, 2011 (KR) .................... 10-2011-0058401

(51) Int. Cl.
*G06F 9/455* (2006.01)
*H04N 21/443* (2011.01)
(Continued)

(52) U.S. Cl.
CPC ..... *H04N 21/4437* (2013.01); *G06F 9/45516* (2013.01); *H04N 21/4316* (2013.01); *H04N 21/4355* (2013.01); *H04N 21/8166* (2013.01)

(58) Field of Classification Search
CPC ............ G06F 9/45533; G06F 9/45516; H04N 21/4437
(Continued)

(56) References Cited

U.S. PATENT DOCUMENTS 7,034,791 B1 * 4/2006 Odom ............................. 345/98
2005/0138609 A1 * 6/2005 Mitchell ....................... 717/136
(Continued)

FOREIGN PATENT DOCUMENTS

| CN | 101800838 A | 8/2010 |
|---|---|---|
| KR | 10-2007-0008561 A | 1/2007 |
| WO | WO 2005/074252 A1 | 8/2005 |

OTHER PUBLICATIONS

Yu-Sheng Lu, Chin-Ho Lee, Hung-Yen Weng, Yueh-Min Huang, Design and Implementation of Digital TV Widget for Android on Multi-core Platform, 2010, IEEE, p. 576-580.*

(Continued)

*Primary Examiner* — Charlie Sun

(74) *Attorney, Agent, or Firm* — Birch, Stewart, Kolasch & Birch, LLP

(57) ABSTRACT

A display apparatus having a virtual machine includes a reception module configured to receive an application written in a specific programming language, a detector configured to detect a first data format included in the application, a translator configured to translate the detected first data format into a second data format capable of being processed by an enhanced virtual machine, the enhanced virtual machine configured to process the translated second data format, a video processor configured to translate the second data format processed by the enhanced virtual machine into outputtable data, and a display module configured to output the translated data.

4 Claims, 17 Drawing Sheets

(51) Int. Cl.
*H04N 21/431* (2011.01)
*H04N 21/435* (2011.01)
*H04N 21/81* (2011.01)

(58) Field of Classification Search
USPC .......................................................... 718/1
See application file for complete search history.

(56) References Cited

U.S. PATENT DOCUMENTS

| | | | |
|---|---|---|---|
| 2006/0033747 A1* | 2/2006 | Chen et al. ................... | 345/592 |
| 2006/0136875 A1* | 6/2006 | Thorpe ................... | G06F 21/16 |
| | | | 717/122 |
| 2007/0143801 A1* | 6/2007 | Madonna et al. .............. | 725/80 |
| 2008/0005767 A1* | 1/2008 | Seo ................................ | 725/62 |
| 2008/0046882 A1* | 2/2008 | Blackhouse .................. | 717/174 |
| 2008/0133781 A1* | 6/2008 | Ashley et al. .................. | 710/17 |
| 2008/0177863 A1* | 7/2008 | Mohan .............. | G06F 17/30899 |
| | | | 709/219 |
| 2009/0113406 A1* | 4/2009 | Bandaram et al. ........... | 717/166 |
| 2009/0228949 A1* | 9/2009 | Benjes et al. ................. | 725/152 |
| 2010/0115501 A1* | 5/2010 | Partridge et al. ............. | 717/148 |
| 2010/0223614 A1* | 9/2010 | Bhayani et al. ................. | 718/1 |
| 2010/0281470 A1* | 11/2010 | Bentz et al. .................. | 717/139 |
| 2011/0016503 A1* | 1/2011 | Schaefer .................. | H04N 5/76 |
| | | | 725/115 |
| 2011/0093836 A1* | 4/2011 | Galicia et al. ................ | 717/139 |

OTHER PUBLICATIONS

Desnos, Anthony, and Geoffroy Gueguen. "Android: From reversing to decompilation." Proc. of Black Hat Abu Dhabi (2011).*
Levy, Compiler Construction, 2004.*
Kuzmanovic et al., "Google's Android as an application environment for DTV decoder system," 2010 IEEE 14th International Symposium on Consumer Electronics, 2010, pp. 1-5, XP031716441.
Lu et al., "Design and Implementation of Digital TV Widget for Android on Multi-core Platform," IEEE, Computer Symposium (ICS), 2010, pp. 576-580, XP031847710.
ETSI, "MHEG-5 Broadcast Profile", ETSI ES 202 184 V2.2.1, ETSI Standard, Mar. 2011, pp. 1-279, XP014064477.
Anonymous, "Just-in-time compilation," Wikipedia, the free encyclopedia, Apr. 6, 2011, pp. 1-5, XP055283150.

* cited by examiner

FIG. 9

| (a) Java code | |
|---|---|
| int add(int a, int b) {<br>    return a + b;<br>} | |
| (b) Java bytecode | (c) Dalvik bytecode |
| iload_1<br>iload_2<br>iadd<br>ireturn | add-int v0, v2, v3<br>return v0 |

FIG. 10

| instruction | Java bytecode | Dalvik bytecode |
|---|---|---|
| Stack Manipulation | LOAD/STORD | MOVE vA, vB |
| Unconditional Jump | GOTO label | GOTO + AA |
| Conditional Jump | IF_ICMPtest label | IF-test vA, vB, +CCCC |
| | IFtest label | IF-testZ vAA, +BBBB |
| Synchronization | MONITORENTER | MONITOR-ENTER vAA |
| | MONITOR-EXIT | MONITOR-EXIT vAA |
| New | NEWclass | NEW-INSTANCE vAA, type@BBBB |
| | NEWARRAY type | NEW-ARRAY vA, vB, type@CCCC |
| Arithmetic | typeADD | ADD-type vAA, vBB, vCC |
| | | ADD-type/2addr vA, vB |
| | | ADD-type/li16 vA, vB #+CCCC |
| | | ADD-type/li8 vAA, vBB #+CC |
| | .... | .... |
| Array operation | typeALOAD | AGET-type vAA, vBB, vCC |
| | typeASTORE | APUT-type vAA, vBB, vCC |
| | ARRAYLENGTH | ARRAY-LENGTH vA, vB |
| Instance Field Access | GETFIELD field type | IGET-type vA, vB, field@CCCC |
| | PUTFIELD field type | IPUT-type vA, vB, field@CCCC |
| Staic Field Access | GETFIELD field type | SGET-type vA, vB, field@CCCC |
| | PUTFIELD field type | GPUT-type vA, vB, field@CCCC |
| Method Invoke | INVOKEkind method | INVOKE-Kind {vD, vE, vF, vG, vA} meth@CCCC |
| | | INVOKE-Kind/RANGE {vCCCC .. VNNNN} meth@CCCC |

| Contents | Uncompressed jar File | | Compressed jar File | | Uncompressed dex File | |
|---|---|---|---|---|---|---|
| | In Bytes | In % | In Bytes | In % | In Bytes | In % |
| Common System Libraries | 21445320 | 100 | 10662048 | 50 | 10311972 | 48 |
| Web browser Application | 470312 | 100 | 232065 | 49 | 209248 | 44 |
| Alarm Check Application | 119200 | 100 | 61658 | 52 | 53020 | 44 |

DISPLAY APPARATUS HAVING VIRTUAL MACHINE AND METHOD OF CONTROLLING THE SAME

This application claims the benefit of U.S. Provisional Patent Application No. 61/477,582 filed on Apr. 20, 2011 and Korean Patent Application No. 10-2011-0058401 filed on Jun. 16, 2011, which is hereby incorporated by reference as if fully set forth herein.

BACKGROUND OF THE INVENTION

Field of the Invention

The present invention relates to a display apparatus, and more particularly, to a display apparatus having a virtual machine and a method of controlling the same. The display apparatus includes, for example, a network TV, a smart TV, a hybrid broadcast broadband television (HBBTV), an Internet TV, a web TV, an Internet protocol television (IPTV), etc. In addition, the display apparatus is applicable to a mobile device.

Discussion of the Related Art

Recently, research into TV capable of receiving and downloading various applications have been accelerated. In addition, a technique of mounting a software platform capable of processing application data in a TV and executing an application desired by a user of the TV has become necessary.

Meanwhile, various kinds of virtual machines have been discussed as an element of the software platform. However, an application written in a specific programming language (e.g., a Java application, etc.) may not be immediately executed by an arbitrary virtual machine.

More specifically, for example, a specific OS mounted in a smart TV should be designed to receive an application implemented in Java language from a server in a state of being translated into a dex format in advance and to perform data processing via the virtual machine. Thus, it is impossible to process a Java class file received while the OS is operated using the virtual machine.

SUMMARY OF THE INVENTION

Accordingly, the present invention is directed to a display apparatus having a virtual machine and a method of controlling the same that substantially obviate one or more problems due to limitations and disadvantages of the related art.

An object of the present invention is to provide an enhanced virtual machine (VM) capable of processing an application (e.g., a Java Class file) written in a specific programming language, which is received over the air or from external device.

Another object of the present invention is to provide a user interface of a TV having the enhanced VM.

Another object of the present invention is to define a solution for translating a first data format into a second data format by the enhanced VM.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display apparatus having a virtual machine includes a reception module configured to receive an application written in a specific programming language, a detector configured to detect a first data format included in the application, a translator configured to translate the detected first data format into a second data format capable of being processed by an enhanced virtual machine, the enhanced virtual machine configured to process the translated second data format, a video processor configured to translate the second data format processed by the enhanced virtual machine into outputtable data, and a display module configured to output the translated data.

In another aspect of the present invention, a method of controlling a display apparatus having a virtual machine includes receiving video data corresponding to a broadcast program and an application written in a specific programming language, demultiplexing the video data and the application, decoding the demultiplexed video data, translating a first data format included in the demultiplexed application into a second data format, displaying the application of the translated data format in a first region of a screen of the display apparatus, and displaying the decoded video data in a second region of the screen of the display apparatus.

According to an embodiment of the present invention, it is possible to provide an enhanced virtual machine (VM) capable of processing an application (e.g., a Java Class file) written in a specific programming language, which is received over the air or from external device.

According to another embodiment of the present invention, it is possible to provide a user interface of a TV having the enhanced VM.

According to another embodiment of the present invention, it is possible to reduce footprint by defining a solution for translating a first data format into a second data format by the enhanced VM.

The effects of the invention will be described in detail below.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is a diagram showing an example of a programming language used in an enhanced VM according to an embodiment of the present invention;

FIG. 10 is a relationship between programming languages translated by an enhanced VM according to an embodiment of the present invention;

DETAILED DESCRIPTION OF THE INVENTION

Hereinafter, the present invention will be described in detail with reference to the drawings. The terms "module" and "unit" attached to describe the names of components are used herein to aid in understanding of the components and thus should not be considered as having specific meanings or roles. Accordingly, the terms "module" and "unit" may be used interchangeably.

A display apparatus described in the present specification is, for example, an intelligent network TV equipped with a computer support function in addition to a broadcast reception function and may include user-friendly interfaces such as a handwriting input device, a touchscreen or a pointing device. The display apparatus is connected to the Internet and a computer using a wired or wireless Internet function so as to perform a function such as email transmission/reception, web browsing, banking or gaming. For such various functions, a standardized general-purpose operating system (OS) may be used.

Accordingly, various applications can be freely added to or deleted from, for example, a general-purpose OS kernel of the display apparatus according to the present invention. Therefore, the display apparatus may perform a number of user-friendly functions.

Embodiments of the present invention will be described in detail with reference to the attached drawings, but it should be understood that they are merely illustrative of the present invention and should not be interpreted as limiting the scope of the present invention.

In addition, although the terms used in the present invention are selected from generally known and used terms, some of the terms mentioned in the description of the present invention, the detailed meanings of which are described in relevant parts of the description herein, have been selected at the discretion of the applicant. Furthermore, the present invention must be understood, not simply by the actual terms used but by the meanings of each term lying within.

Figure 1:
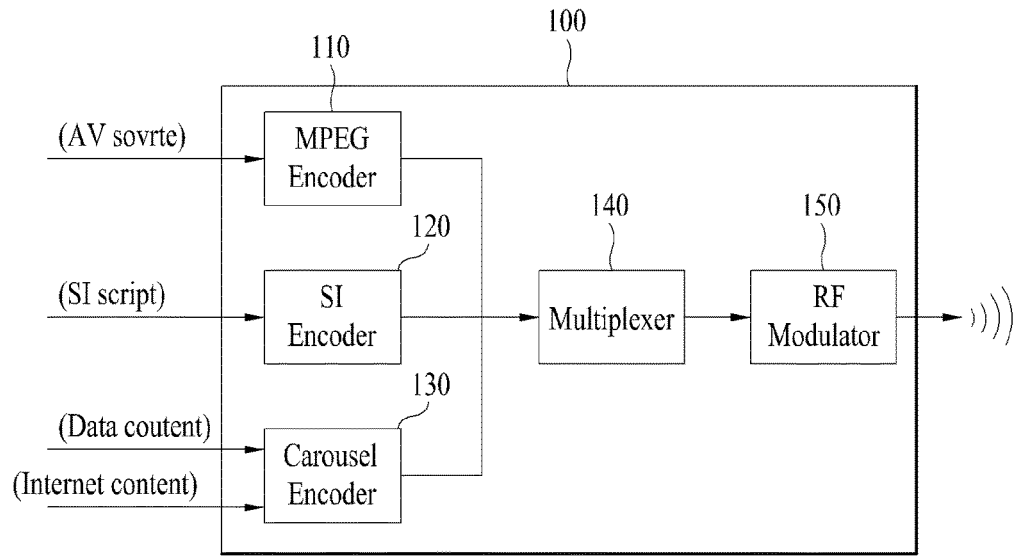
FIG. 1 is a diagram showing components of a system for transmitting a data broadcast according to an embodiment of the present invention.

FIG. 1 is a diagram showing components of a system for transmitting a data broadcast according to an embodiment of the present invention. Hereinafter, the system for transmitting the data broadcast according to the embodiment of the present invention will be described with reference to FIG. 1.

The broadcast system 100 shown in FIG. 1 includes an MPEG encoder 110, a system information (SI) encoder 120, a carousel encoder 130, a multiplexer 140 and a radio frequency (RF) modulator 150. In addition, the broadcast system 100 includes, for example, a broadcast station or a content provider (CP).

The MPEG encoder 110 is designed to encode AV data corresponding to a general broadcast program into an MPEG format, for example. The SI encoder 120 encodes an SI script and transmits the encoded SI script to the multiplexer 140.

Further, the carousel encoder 130 encodes an application corresponding to content for data broadcast or Internet content and transmits the encoded application to the multiplexer 140. The application is written in a specific programming language (e.g., Java application, etc.).

The multiplexer 140 is designed to multiplex data received from the encoders 110, 120 and 130 and the RF modulator 150 is designed to translate the multiplexed data into an RF signal and multicast the RF signal to TVs.

As described above, the broadcast system 100 sends, for example, a Java class file to a display apparatus (e.g., a digital television, etc.) using the RF modulator 150. However, the Java class file transmitted by the broadcast system 100 may not be directly executed by the display apparatus including a specific OS because the display apparatus cannot process the Java class file received while the specific OS is operated.

In order to solve such a problem, in the present invention, an enhanced virtual machine (VM) including a translator for translating a class file into a dex file in advance is proposed, which will be described in detail with reference to FIG. 2.

Figure 2A:
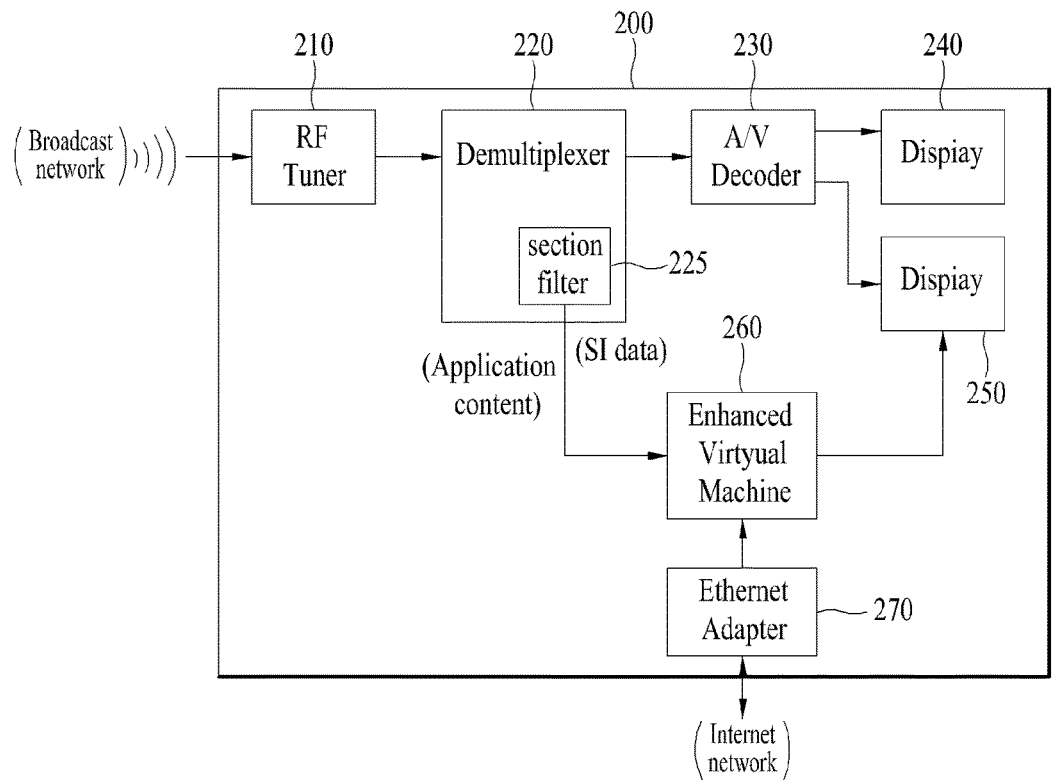
FIG. 2a is a diagram showing components of a display apparatus for receiving a data broadcast according to an embodiment of the present invention.

FIG. 2a is a diagram showing components of a display apparatus for receiving a data broadcast according to an embodiment of the present invention. Hereinafter, a process of receiving and processing a broadcast signal by a display apparatus having an enhanced VM according to an embodiment of the present invention will be described.

As shown in FIG. 2a, the display apparatus 200 includes an RF tuner 210, a demultiplexer 220, an AV decoder 230, a speaker 240, a display 250, an enhanced VM (260), and an Ethernet adapter 270. The blocks shown in FIG. 2a are exemplary and the scope of the present invention is defined by the claims in principle.

Further, the demultiplexer 220 may additionally include a section filter 225. Alternatively, the section filter 225 may be located outside the demultiplexer, which may fall within the scope of the present invention. The display apparatus 200 includes, for example, a smart TV, a network TV, an HBBTV, an IPTV, a DTV and a mobile device (a mobile telephone, a smart phone, etc.).

The RF tuner 210 shown in FIG. 2a receives the broadcast signal transmitted by the broadcast system 100 shown in FIG. 1. The demultiplexer 220 demultiplexes multiplexed data and transmits AV data corresponding to a broadcast program to the AV decoder 230.

The demultiplexer 220 demultiplexes SI data and an application and transmits them to the enhanced VM 260. Further, the SI data is filtered by the above-described section filter 225, which is designed to collect only SI scripts having the same packet identification (PID), for example.

The AV decoder 230 decodes the AV data corresponding to a broadcast program, transmits the audio data to the speaker 240 and transmits the video data to the display module 250. The display module 250 is designed to output a Java application processed by the enhanced VM 260. The enhanced VM 260 will be described below in greater detail with reference to FIG. 6.

That is, the display apparatus 100 according to the embodiment of the present invention includes a reception module for receiving an application written in a specific programming language, a detector for detecting a first data format included in the application, a translator for translating the detected first data format into a second data format capable of being processed by an enhanced VM, the enhanced VM for processing the translated second data format, a video processor for translating the second data format processed by the enhanced VM into outputtable video data, and a display module for outputting the translated video data. The reception module corresponds to, for example, the RF tuner 210 shown in FIG. 2a, the detector and the translator are, for example, included in the enhanced VM 260 shown in FIG. 2a, and the video processor is, for example, included in the display module 250 shown in FIG. 2a.

The enhanced VM 260 according to another embodiment of the present invention decompresses the first data format composed of at least two class files, performs a loading and translation process with respect to the class files, and merges the class files subjected to the loading and translation process so as to generate the second data format, which will be described below in greater detail with reference to FIG. 14.

The term "decompression" used in the specification means a function for decompressing a compressed file, for example, a function for translating a package compressed in a ZIP format into a plurality of pieces of data.

The term "merging" used in the specification means a function for translating two or more data sets into one data set, for example, a function for combining several class files to one dex file.

The enhanced VM 260 according to another embodiment of the present invention executes a downloaded file if the downloaded file is not a class file and translates a downloaded file into a dex file and executes the dex file if the downloaded file is a class file, which will be described below in greater detail with reference to FIG. 15.

The enhanced VM 260 according to another embodiment of the present invention is designed to generate one second data format sharing a constant pool included in each class file of the first data format, which will be described below in greater detail with reference to FIGS. 11 and 12.

The application written in the specific programming language corresponds to a Java application, for example. Further, the first data format corresponds to, for example, a Java class file and the second data format corresponds to, for example, a dex file.

The Java application may be received over the air or from an external device. The case where the Java application is received over the air will be described below with reference to FIG. 15 and the case where the Java application is received from the external device will be described below with reference to FIG. 16.

In particular, in the case where the Java application is received over the air, the RF tuner 210 shown in FIG. 2a receives video data corresponding to a broadcast program and an application written in a specific programming language.

The demultiplexer 220 demultiplexes the video data and the application and the AV decoder 230 decodes the demultiplexed video data.

The enhanced VM 260 converts a first data format included in the demultiplexed application into a second data format. The display module 250 is designed to display the application of the translated data format in a first region of a screen of the display apparatus 200 and to display the decoded video data in a second region of the screen of the display apparatus 200.

Further, as shown in FIG. 2a, the Java application is sent to the enhanced VM 260 according to the embodiment of the present invention through two paths.

First, if the Java application is received over a broadcast network, the Java application is executed in the enhanced VM 260 using SI information and carousel information received from the section filter 225.

Meanwhile, if the Java application is received over an Internet network, the Java application is downloaded to a memory (e.g., a flash memory, etc.) using URL information extracted from an application information table (AIT). At this time, the present invention is characterized in that the above-described Java application is designed to be sent via the Ethernet adapter 270.

Figure 2B:
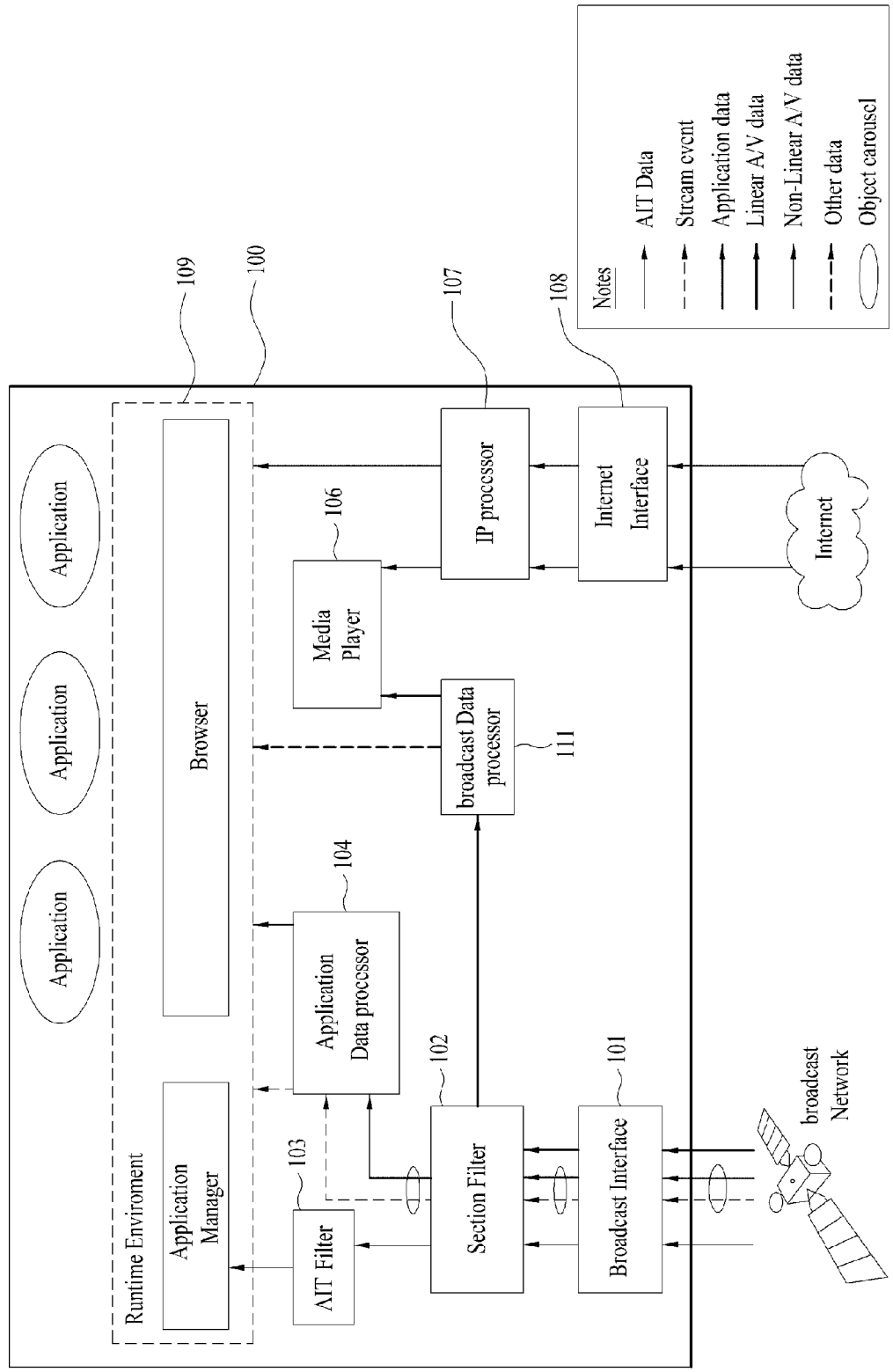
FIG. 2b is a diagram showing hardware components of a hybrid broadcast broadband television (HBBTV) having a virtual machine (VM) according to an embodiment of the present invention.

FIG. 2b is a diagram showing hardware components of a hybrid broadcast broadband television (HBBTV) having a virtual machine (VM) according to an embodiment of the present invention. Hereinafter, the hardware components of the HBBTV having the VM according to the embodiment of the present invention will be described.

As shown in FIG. 2b, the HBBTV 100 includes, for example, a broadcast interface 101, a section filter 102, an AIT filter 103, an application data processor 104, a broadcast data processor 111, a media player 106, an Internet protocol processor 107, an Internet interface 108, a runtime module 109, and an enhanced VM 110. The scope of the present invention is not limited to the components shown in FIG. 2b and a module may be added or any of the above-described components may be deleted as necessary. In particular, the above-described enhanced VM 110 will be described below in detail with reference to FIG. 6.

Through the broadcast interface 101, AIT data, real-time broadcast content, application data and stream events are received. The real-time broadcast content may be referred to as linear A/V content.

The section filter 102 performs section filtering with respect to four pieces of data received through the broadcast interface 101, transmits the AIT data to the AIT filter 103, transmits the linear A/V content to the broadcast data processor 111, and transmits the stream events and the application data to the application data processor 104.

Meanwhile, through the Internet interface 108, non-linear A/V content and application data are received. The non-linear A/V content may be a content on demand (COD) application, for example.

The non-linear A/V content is transmitted to the media player 106 and the application data is transmitted to the runtime module 109.

Further, the runtime module 109 includes an application manager and a browser, for example, as shown in FIG. 2b. The application manager controls a lifecycle of an interactive application using the AIT data, for example. The browser performs a function for displaying and processing the interactive application, for example.

In particular, the enhanced VM 110 for processing the application received over the Internet network will now be described.

The AIT of the broadcast data sent over the broadcast network is filtered by the section filter 102 or the AIT filter 103. If URL information is parsed from the filtered AIT, the Internet interface 108 is designed to receive a specific application using the URL information.

The enhanced VM 110 stores the application received over the Internet interface 108 or the application data processor 104 in a flash memory, for example. The enhanced VM 110 is designed to execute a previously stored application through the runtime module 109.

Figure 3:
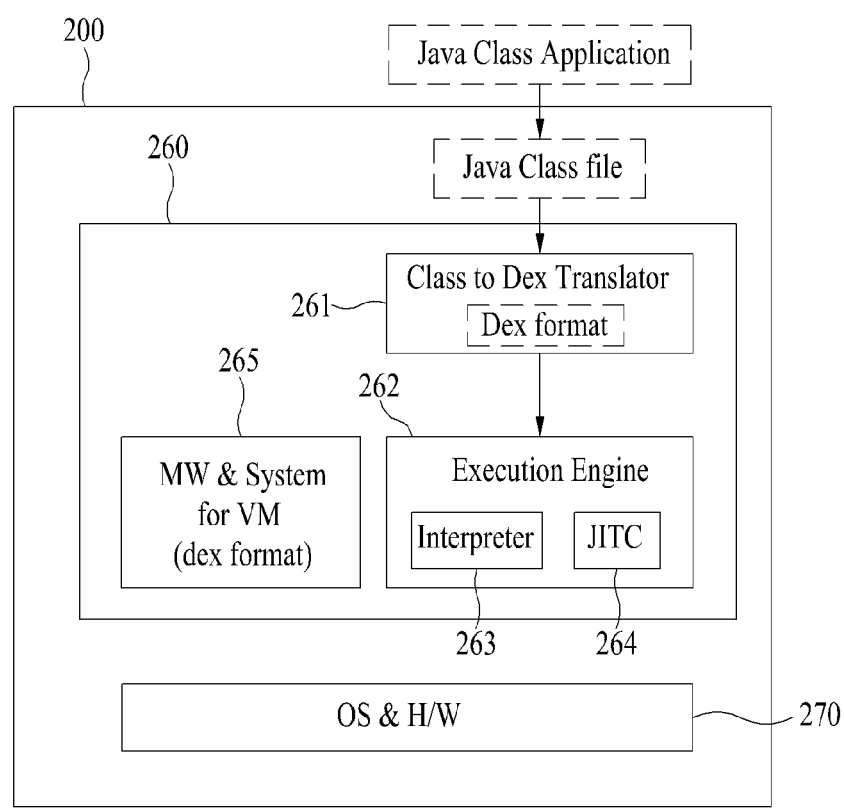
FIG. 3 is a diagram showing an enhanced VM shown in FIG. 2a or 2b in detail.

FIG. 3 is a diagram showing an enhanced VM shown in FIG. 2a or 2b in detail. Hereinafter, the enhanced VM according to the embodiment of the present invention will be described in greater detail with reference to FIG. 3.

As shown in FIG. 3, the display apparatus according to the embodiment of the present invention has an enhanced VM 260. Further, the display apparatus 200 includes an OS & HW configuration 270. The hardware configuration of the display apparatus will be described below with reference to FIGS. 7 and 8.

The enhanced VM 260 according to the embodiment of the present invention includes a class/dex translator 261, an execution engine 262 and middleware (MW) & a system (265). The execution engine 262 further includes an interpreter 263 and a Just in Time Compiler (JITC) 264. The components shown in FIG. 3 are exemplary and the scope of the present invention is defined by the claims in principle.

Since the MW & system 265 receives an application translated into a dex format in advance through a server, the translated application can be processed by the VM. However, an application (e.g., a Java application) written in a specific programming language received while the VM is operated may not be translated in advance. Accordingly, as shown in FIG. 3, the present invention is characterized in that the class/dex translator 261 is added to the VM.

More specifically, a dex loader of the enhanced VM 260 according to the embodiment of the present invention checks an extension of a received file and sends the file to the class/dex translator 261 if the extension is ".class". The class/dex translator 261 reads the class file, translates the class file into a dex file, and sends the dex file to the dex loader.

Figures 12, 13:
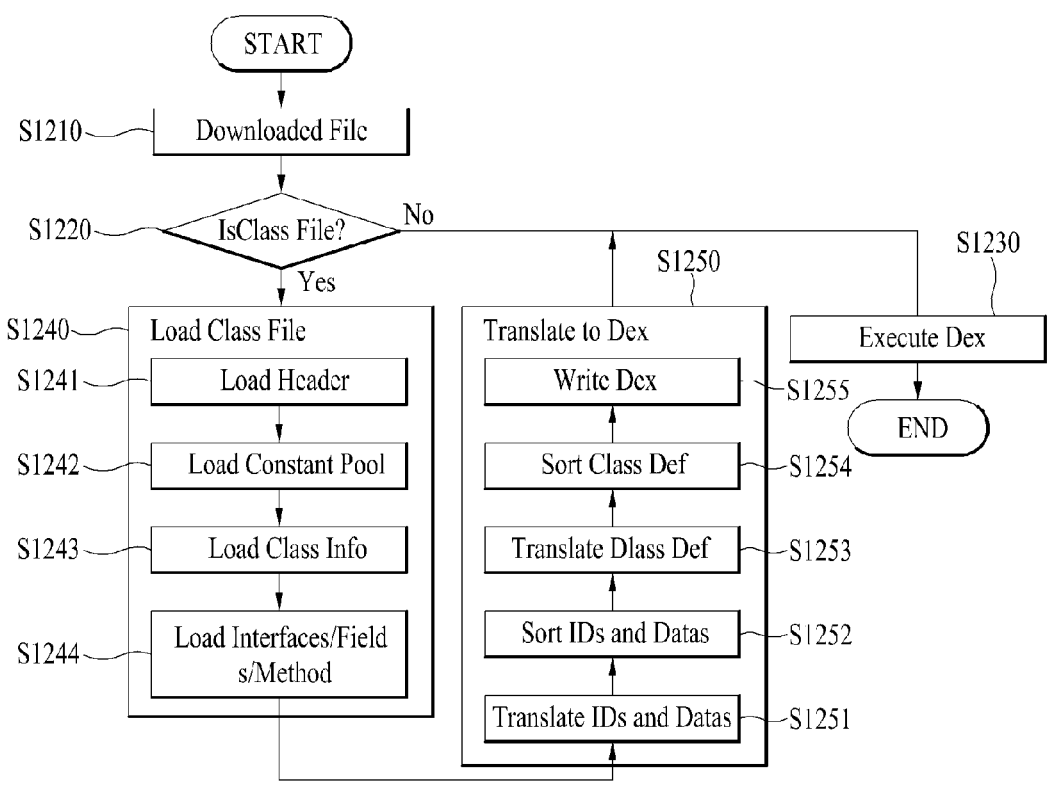
FIG. 12 is a diagram illustrating a result of reducing footprint according to the sharing process of FIG. 11.
FIG. 13 is a flowchart showing a process of translating data in class units by an enhanced VM according to an embodiment of the present invention.

Several Java class files may be translated to one dex file (see FIG. 14) or one class file may be translated into one dex format whenever the transmitted class file needs to be translated (see FIG. 13).

In the Java class file, information about a string, a field and a method is stored in one constant pool. In contrast, in the dex file, information about a string, a field, a method, a parameter and a class file is separated into different ID lists. Accordingly, first, information about the string, the field and the method are collected from the Java class and a class definition structure of an enhanced VM is generated using the class information.

A string is translated into a string list and string data of the enhanced VM. The string list stores metadata of the string and actual string information is stored in a data region of the enhanced VM.

Type information used in the field and method is collected. A type list is generated using the collected type information and a list of a method parameter is generated using the parameter of the method. Further, information about the field is divided into "instance" and "static" so as to generate a list and information about the method is divided into "direct" and "virtual" so as to generate a list.

The above-described ID list and the lists of the data region have respective specific values and are aligned in order of the values. Since an offset is used to indicate a value included in the data region in the ID list, the offset may be changed as a value between the ID list and the data region is added. Accordingly, it is necessary to generate a dex format in predetermined order.

First, a header of a dex format is generated. An ID list such as a string ID list, a type ID list and a prototype ID list is first generated and data values such as class data, string data and a dex map table are sequentially generated. After the data values are generated, the offset value of the ID list is corrected.

Figure 4:
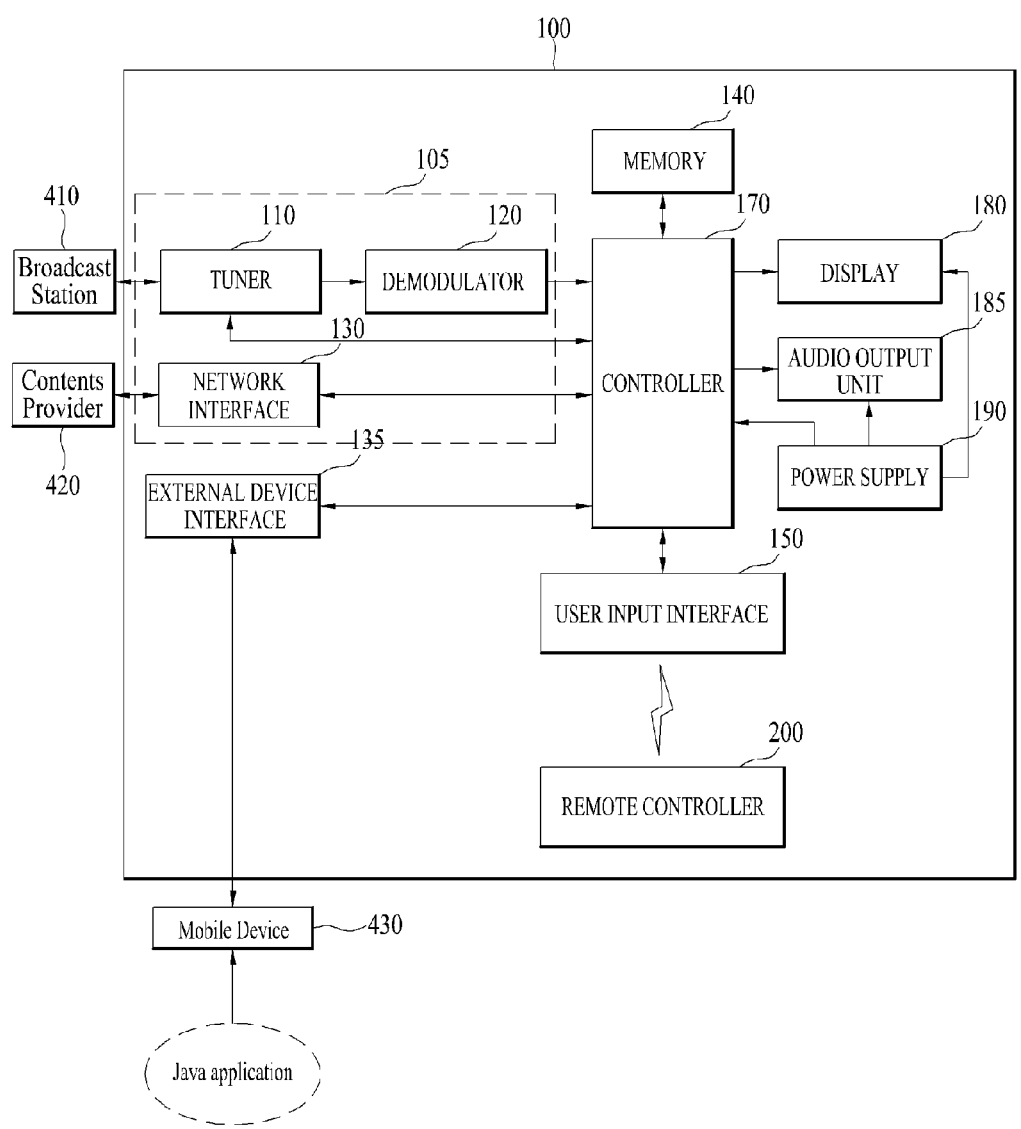
FIG. 4 is a diagram showing various paths for receiving an application written in a specific computing language by a display apparatus according to an embodiment of the present invention.

FIG. 4 is a diagram showing various paths for receiving an application written in a specific computing language by a display apparatus according to an embodiment of the present invention. Hereinafter, three paths for receiving the application written in the specific computing language by the display apparatus according to the embodiment of the present invention will be described with reference to FIG. 4.

In the display apparatus 100 shown in FIG. 4, it is assumed that the enhanced VM according to the embodiment of the present invention is stored in a memory. The enhanced VM is described above with respect to FIG. 3.

As shown in FIG. 4, the tuner of the display apparatus 100 according to the embodiment of the present invention receives a data broadcast (e.g., data written in a Java application) from a broadcast station 410. Further, the received data broadcast is demodulated by a demodulator 120 and the demodulated data broadcast is sent to a controller 170. The data format of the Java application of the data broadcast is translated in real time according to the enhanced VM stored in the memory 140.

Next, as shown in FIG. 4, the network interface 130 of the display apparatus 100 according to the embodiment of the present invention receives a Java application from a CP 420 or a server. The data format of the Java application is translated in real time according to the enhanced VM stored in the memory 140.

Finally, as shown in FIG. 4, the external device interface 135 of the display apparatus 100 according to the embodiment of the present invention receives a Java application from a mobile device (e.g., a mobile phone, etc.). The data format of the Java application is translated according to the enhanced VM stored in the memory 140.

Figure 5:
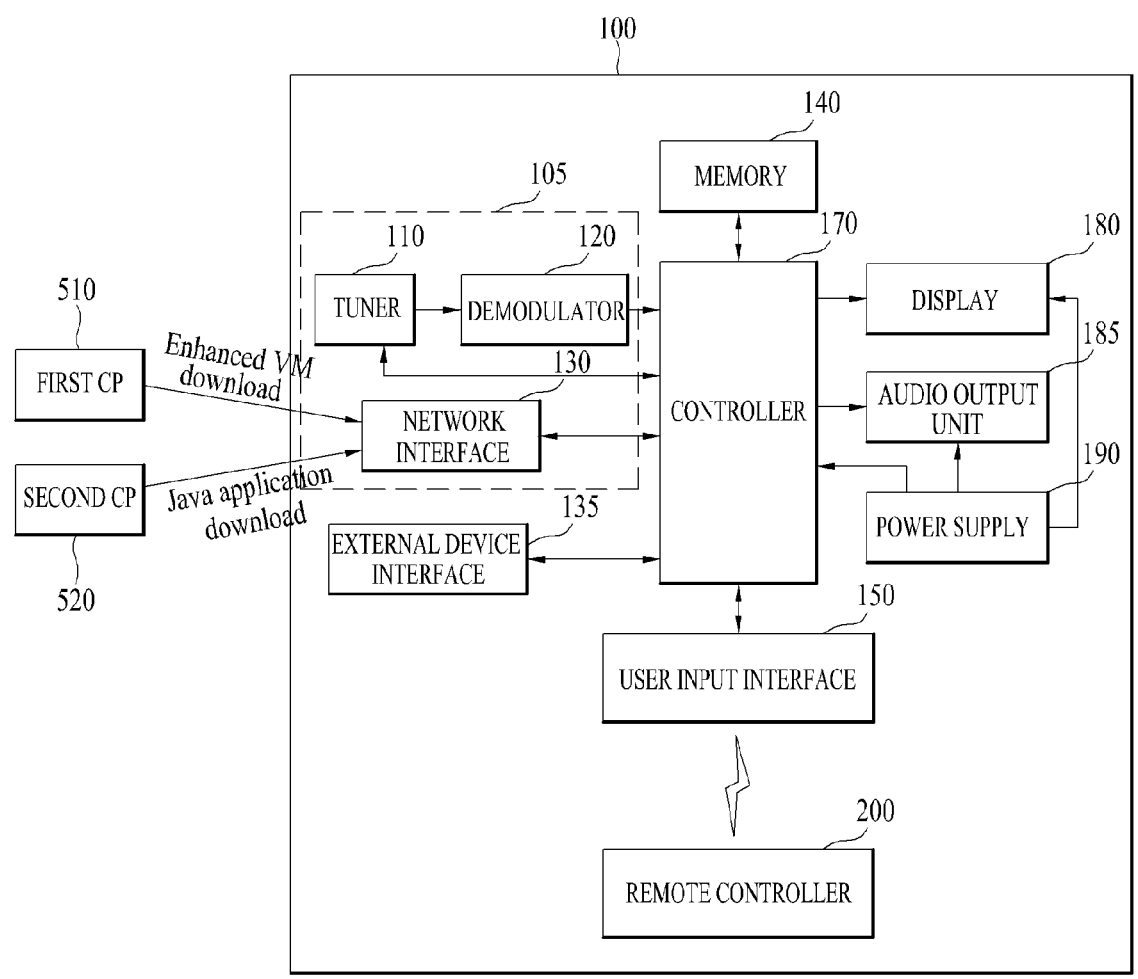
FIG. 5 is a diagram showing a process of downloading an enhanced VM by a display apparatus according to an embodiment of the present invention.

FIG. 5 is a diagram showing a process of downloading an enhanced VM by a display apparatus according to an embodiment of the present invention. Hereinafter, the process of downloading the enhanced VM by the display apparatus according to the embodiment of the present invention will be described with reference to FIG. 5.

Unlike FIG. 4, in the display apparatus 100 shown in FIG. 5, it is assumed that the enhanced VM according to the embodiment of the present invention is not stored in the memory at first. The enhanced VM is described above with respect to FIG. 3.

First, the network interface 130 of the display apparatus 100 preferentially accesses a first CP 510 for providing the VM according to the embodiment of the present invention. Then, the enhanced VM provided by the first CP 510 is downloaded through the network interface 130. The downloaded VM is designed to be uploaded to the memory 140 shown in FIG. 5.

The network interface 130 of the display apparatus 100 is designed to receive a Java application from a second CP 520 for providing an arbitrary application. The second CP 520 may be the same server as the first CP 510 or may be a server different from the first CP 510. Accordingly, according to the enhanced VM stored in the memory 140, the present invention is characterized in that the data format of the Java application received from the second CP 520 is translated in real time.

Figure 6:
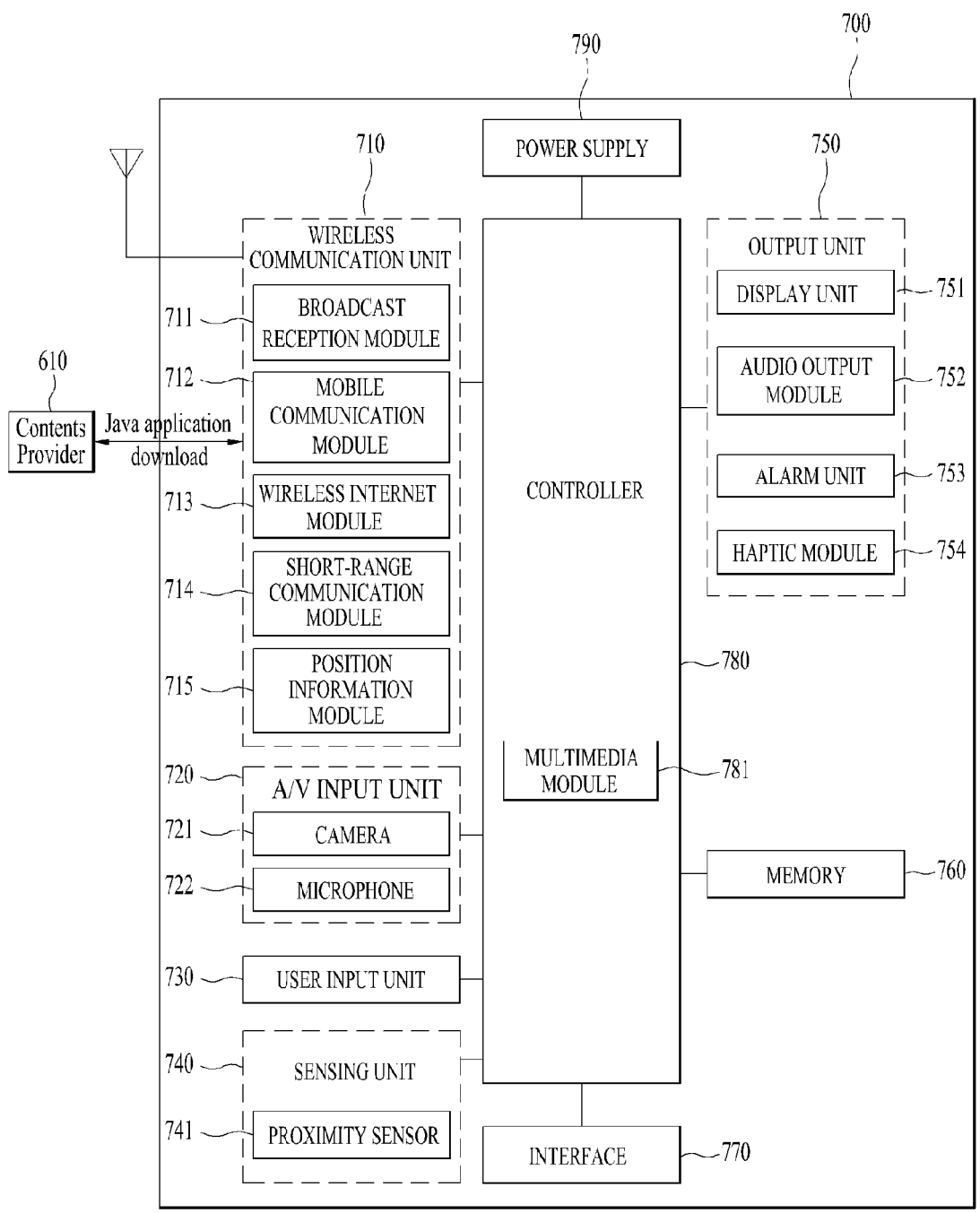
FIG. 6 is a diagram showing a process of receiving an application written in a specific computing language by a mobile device according to an embodiment of the present invention.

FIG. 6 is a diagram showing a process of receiving an application written in a specific computing language by a mobile device according to an embodiment of the present invention. Hereinafter, the process of receiving the application written in the specific computing language by the mobile device according to the embodiment of the present invention will be described with reference to FIG. 6.

The mobile device 700 shown in FIG. 6 corresponds to a smart phone or a general mobile phone, for example. The mobile device 700 may include a wireless communication unit 710, an Audio/Video (A/V) input unit 720, a user input unit 730, a sensing unit 740, an output unit 750, a memory 760, an interface 770, a controller 780 and a power supply 790.

The wireless communication unit 710 may include one or more modules for performing wireless communication between the mobile device 700 and a wireless communication system or between the mobile device 700 and a network in which the mobile device 700 is located. For example, the wireless communication unit 710 may include a broadcast reception module 711, a mobile communication module 712, a wireless Internet module 713, a short-range communication module 714 and a position information module 715.

In particular, the wireless communication unit 710 is designed to receive a Java application from a CP 610 which is an example of a server located outside the mobile device 700. The memory 760 stores the enhanced VM according to the embodiment of the present invention. Accordingly, the Java application received from the CP 610 is processed according to the enhanced VM stored in the memory 760 and the controller 780 is designed to control a display 751 to rapidly execute the Java application.

For reference, the A/V input unit 720 receives an audio signal or a video signal and includes a camera 721 and a microphone 722. The user input unit 730 generates input data enabling the user to control the operation of the terminal. The user input unit 730 may include a keypad, a dome switch, a touchpad (static pressure/static electrical), a jog wheel and a jog switch.

The sensing unit 740 detects a current state of the mobile device 700 such as whether the mobile device 700 is opened or closed, the position of the mobile device 700, or whether or not the user has contacted the mobile device 700 and generates a sensing signal for controlling the operation of the mobile device 700.

The output unit 750 is provided to output an audio or video signal or a tactile signal and may include the display unit 751, an audio output module 752, an alarm unit 753, and a haptic module 754.

The memory 760 may store a program for operation of the controller 780 and may temporarily store input or output data (for example, a phonebook, messages, still images, and moving images). The memory 760 stores data regarding vibrations and sounds of various patterns output when touch input of the touchscreen is detected. As described above, the memory 760 stores the enhanced VM described with reference to FIG. 3.

The interface 770 serves as an interface with all external devices connected to the mobile device 700. The interface 770 may receive data from an external device, receive power from and transmit power to the components of the mobile device 700 or transmit data of the mobile device 700 to an external device.

Figure 7:
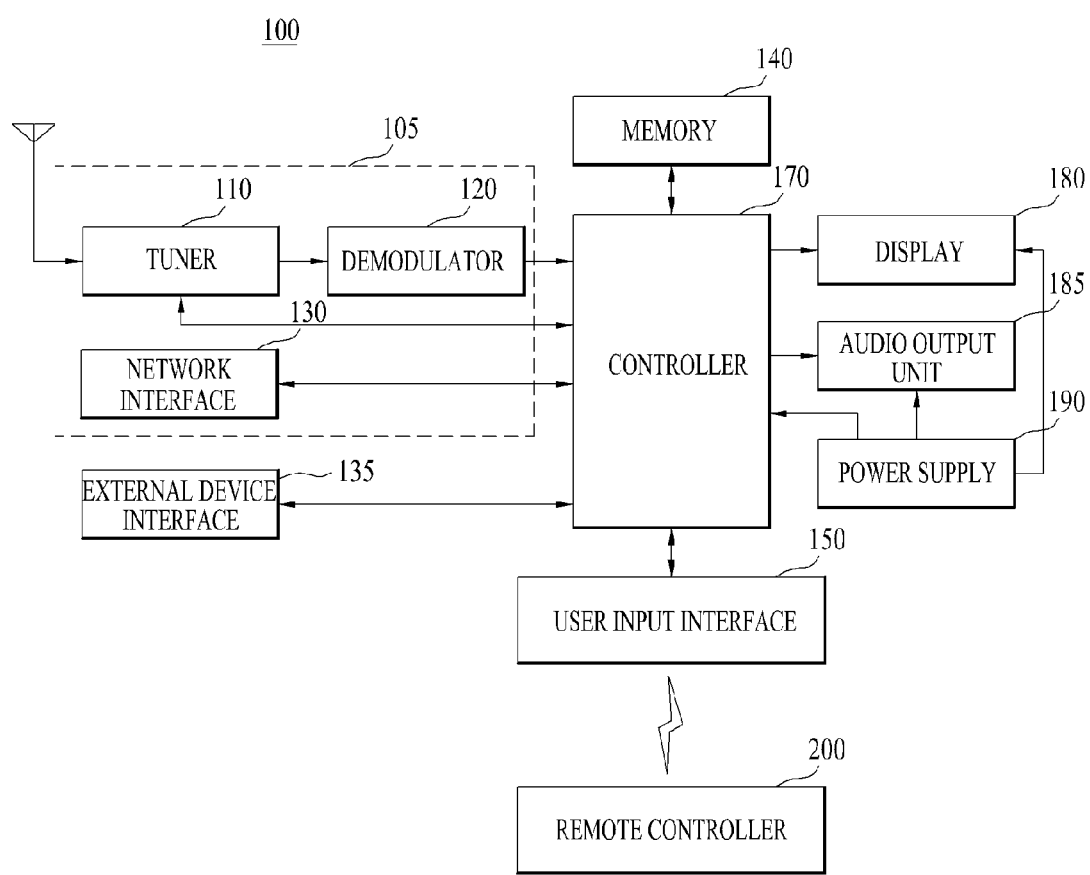
FIG. 7 is a diagram briefly showing a display apparatus including an external device interface.

FIG. 7 is a diagram briefly showing a display apparatus including an external device interface. FIG. 7 shows another embodiment in which the external device interface 135 is added.

As shown in FIG. 7, the display apparatus 100 according to another embodiment of the present invention includes a broadcast reception unit 105, an external device interface 135, a memory 140, a user input interface 150, a controller 170, a display 180, an audio output unit 185, a power supply 190 and a capturing unit (not shown).

The broadcast reception unit 105 may include a tuner 110, a demodulator 120 and a network interface 130. As needed, the broadcast reception unit 105 may be configured so as to include only the tuner 110 and the demodulator 120 or only the network interface 130.

The tuner 110 tunes to Radio Frequency (RF) broadcast signals corresponding to all previously stored channels or channels selected by a user from among a plurality of RF broadcast signals received through an antenna. The demodulator 120 receives the digital IF signal DIF from the tuner 110 and demodulates the digital IF signal DIF.

The demodulator 120 may perform demodulation and channel decoding on the digital IF signal DIF, thereby obtaining a Transport Stream (TS). The TS may be a signal in which a video signal, an audio signal and a data signal are multiplexed. For example, the TS may be an MPEG-2 TS in which an MPEG-2 video signal and a Dolby AC-3 audio signal are multiplexed. An MPEG-2 TS may include a 4-byte header and a 184-byte payload.

The TS output from the demodulator 120 may be input to the controller 170 and thus subjected to demultiplexing and A/V signal processing. The processed video and audio signals are output to the display 180 and the audio output unit 185, respectively.

The external device interface 135 may serve as an interface between an external device and the display apparatus 100. For interfacing, the external device interface 135 may include an A/V Input/Output (I/O) unit (not shown) and/or a wireless communication module (not shown).

The external device interface 135 may be connected to an external device such as a Digital Versatile Disc (DVD) player, a Blu-ray player, a game console, a camera, a camcorder, or a computer (e.g., a laptop computer), wirelessly or by wire. Then, the external device interface 135 externally receives an application or an application list from an adjacent external device and transmits the application or the application list to the controller 170 or the memory 140.

The network interface 130 may include an Ethernet port for connection to a wired network. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HS- DPA). In addition, the network interface 130 may selectively receive a desired application among open applications over a network.

The memory 140 may store various programs necessary for the controller 170 to process and control signals, and may also store processed video, audio and data signals.

The memory 140 may temporarily store a video, audio and/or data signal received from the external device interface 135 or the network interface 130. The memory 140 may store the application or the application list received from the external interface 135 or the network interface 130.

The user input interface 150 transmits a signal received from the user to the controller 170 or transmits a signal received from the controller 170 to the user. For example, the user input interface 150 may receive control signals such as a power-on/off signal, a channel selection signal, and a screen setting signal from a remote controller 200 or may transmit a control signal received from the controller 170 to the remote controller 200, according to various communication schemes, for example, RF communication and IR communication.

The controller 170 may demultiplex the TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135. The audio signal processed by the controller 170 may be output to the audio output unit 185. The audio signal processed by the controller 170 may be transmitted to the external output device through the external device interface 135.

The display 180 may convert a processed video signal, a processed data signal, and an OSD signal received from the controller 170 or a video signal and a data signal received from the external device interface 135 into RGB signals, thereby generating driving signals. The display 180 may be various types of displays such as a Plasma Display Panel (PDP), a Liquid Crystal Display (LCD), an Organic Light-Emitting Diode (OLED) display, a flexible display, and a 3D display.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

The power supply 190 supplies power to the display apparatus 100. Particularly, the power supply 190 may supply power to the controller 170 which may be implemented as a System On Chip (SOC), the display 180 for displaying an image, and the audio output unit 185 for audio output.

The remote controller 200 transmits user input to the user input interface 150. For transmission of user input, the remote controller 200 may use various communication techniques such as Bluetooth, RF communication, IR communication, Ultra Wideband (UWB) and ZigBee.

The enhanced VM 260 shown in FIG. 6 may be designed to correspond to the controller 170 shown in FIG. 7 or may be stored in the memory 140. Accordingly, not only an application written in a specific programming language included in a broadcast signal and an application received over a network but also an application received from an external device (e.g., a BD player) may be processed by the enhanced VM of the memory 140 or the controller 170. In particular, the processing of the application received from the external device will be described below with reference to FIG. 16.

Figure 8:
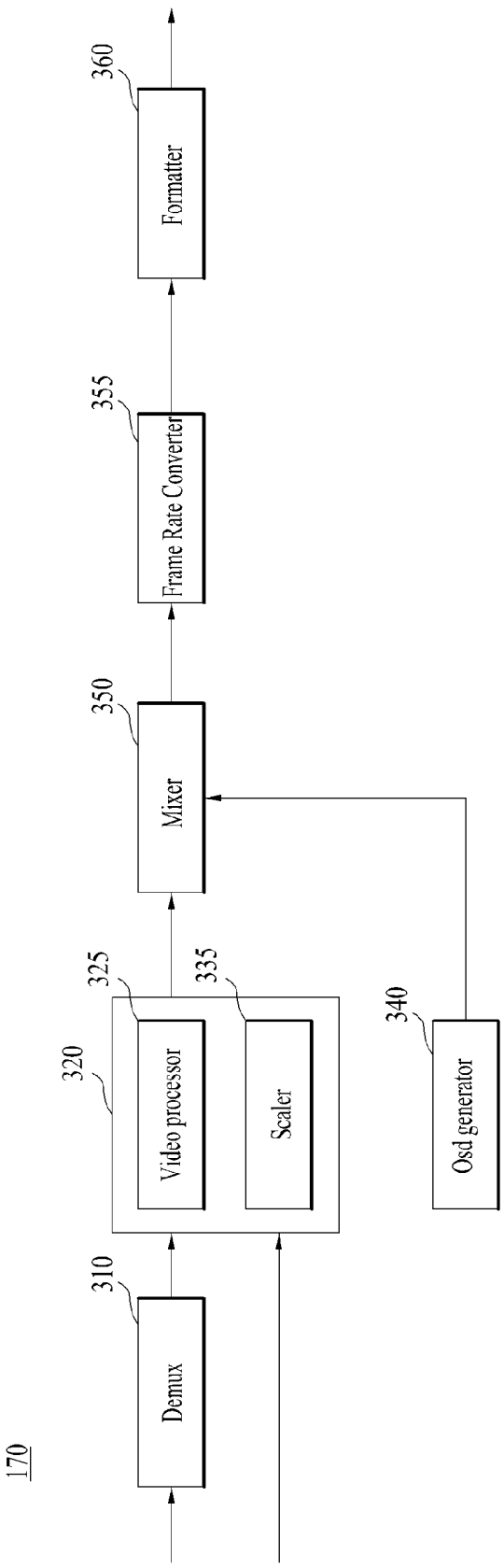
FIG. 8 is a diagram showing a controller shown in FIG. 7 in detail.

FIG. 8 is a diagram showing a controller shown in FIG. 7 in detail. Hereinafter, the controller shown in FIG. 7 will be described with reference to FIG. 8.

As shown in FIG. 8, the controller 170 according to the embodiment of the present invention may include a DEMUX 310, a video processor 320, an OSD generator 340, a mixer 350, a Frame Rate Converter (FRC) 355, and a formatter 360. The controller 170 may further include an audio processor (not shown) and a data processor (not shown).

The DEMUX 310 demultiplexes an input stream. The video processor 320 may process the demultiplexed video signal. Accordingly, the video processor 320 may include a video decoder 325 and a scaler 335.

The video decoder 325 decodes the demultiplexed video signal and the scaler 335 scales the decoded video signal so that the video signal can be displayed on the display 180. The video signal decoded by the video processor 320 is provided to the mixer 350.

The OSD generator 340 generates an OSD signal autonomously or according to user input. For example, the OSD generator 340 may generate signals by which a variety of information is displayed as graphics or text on the display 180, based on control signals received from the user input interface 150.

For example, the OSD generator 340 may generate a signal by which subtitles are displayed for a broadcast image or Electronic Program Guide (EPG)-based broadcasting information. In addition, the OSD generator generates an OSD signal (e.g., headlines, stock news, etc.) for outputting an application processed by the enhanced VM according to the embodiment of the present invention.

The mixer 350 may mix the decoded video signal processed by the image processor 220 with the OSD signal generated by the OSD generator 340 and output the mixed signal to the formatter 360. As the decoded broadcast video signal or the externally input signal is mixed with the OSD signal, an OSD may be overlaid on the broadcast image or the externally input image.

The FRC 355 may change the frame rate of an input image signal. For example, a frame rate of 60 Hz is converted into a frame rate of 120 or 240 Hz. When the frame rate is to be changed from 60 Hz to 120 Hz, a first frame is inserted between the first frame and a second frame, or a predicted third frame is inserted between the first and second frames. If the frame rate is to be changed from 60 Hz to 240 Hz, three identical frames or three predicted frames are inserted between the first and second frames. It is also possible to maintain the frame rate of the input image without frame rate conversion.

The formatter 360 changes the format of the signal received from the FRC 355 to suit the display 180. For example, the formatter 360 may convert a received signal into an RGB data signal. The RGB signal may be output in the form of a Low Voltage Differential Signal (LVDS) or mini-LVDS.

An embodiment in which the OSD generator 340 shown in FIG. 8 displays a Java application will be described in greater detail with reference to FIG. 15.

FIG. 9 is a diagram showing an example of a programming language used in an enhanced VM according to an embodiment of the present invention. Hereinafter, the data format used in the enhanced VM according to the embodiment of the present invention will be described with reference to FIG. 9.

In general, the application is distributed in a state of being written in a specific programming language. However, as described above, the distributed application may not be processed while an OS is operated. Accordingly, the present invention is characterized in that the application written in a specific language (e.g., a Java language) is translated into a class file using the enhanced VM shown in FIG. 6 and several class files are then translated into a dex format.

Bytecodes of a first format included in the existing Java class file are translated into bytecodes of a second format. In FIG. 9, a Java bytecode is shown as the bytecode of the first format and a Dalvik bytecode is shown as the bytecode of the second format. However, FIG. 9 shows an embodiment for ease of description and the scope of the present invention is not limited to a specific bytecode.

The Dalvik bytecode includes a 1-byte command similarly to the Java bytecode. However, while the Java bytecode employs a method of storing values necessary to perform an operation and then performing the operation, the enhanced VM according to the embodiment of the present invention employs a method of explicitly specifying a register in which a value necessary to perform an operation is stored.

As shown in FIG. 9, in the case of a simple addition example, in the Java bytecode, variables a and b are moved to a stack using iload and are then added using a command iadd. In contrast, in the enhanced VM, registers v2 and v3, in which variables a and b to be used in a command add-int are stored, are explicitly indicated. While four commands are used for the Java bytecode, only two commands are used for the Dalvik bytecode used in the enhanced VM. Accordingly, the Dalvik bytecode used in the enhanced VM according to the embodiment of the present invention can be more rapidly executed.

In addition, in a Java class file, information about a string, a field, a function, etc. used in a Java application is stored in a constant pool to be used. A variety of information is mixed in the Java constant pool and the kinds of entries included in the constant pool are distinguishably used using tags. In contrast, in the dex format, meta information of the constant pool is stored in an ID list and all actual values of the constant pool are stored in a data region of the dex format.

Several class files may be translated into one dex file. Since overlapping values in the constant pool may be combined into one value when several Java class files are translated into one dex file, the size of the dex file may be reduced, which will be described with reference to FIGS. 11 and 12.

FIG. 10 is a relationship between programming languages translated by an enhanced VM according to an embodiment of the present invention. Hereinafter, the relationship between the Java bytecode and the Dalvik bytecode translated by the enhanced VM according to the embodiment of the present invention will be described with reference to FIG. 10.

A Java bytecode value may be generally stored in a stack or as a local variable. However, the enhanced VM according to the embodiment of the present invention is designed such that a bytecode value is stored in a register. For example, each Java stack position is predetermined to a register of a fixed dex. That is, a $0^{th}$ Java stack position is equal to a $0^{th}$ register of a dex as follows.

Stack 0 (Java VM)=>v0 (Enhanced VM)

Further, after the register to be used in the dex format is determined, each Java bytecode is translated into a Dalvik bytecode. In order to execute the Java bytecode, values are stored in the stack.

In order to add a value to a stack or store a value of a stack as a local variable, commands "load" and "store" are used. For more rapid translation, translation of "load" and "store" into a command "move" of the enhanced VM may fall within the scope of the present invention. In particular, the process of replacing "LOAD/STORE" with "MOVE" shown in FIG. 10 will now be described in detail.

The bytecode "load" used in the general Java VM indicates that a value stored as a java local variable is pushed to a stack. For example, "iload_0" indicates a process of pushing a $0^{th}$ java local variable to a stack. In addition, the bytecode "store" used in the general Java VM indicates that a value stored in a stack is popped and stored as a java local variable. For example, "istore_0" indicates a process of storing a result of popping a value stored in a stack as a $0^{th}$ java local variable.

The java local variable and each entry of the stack are translated into a virtual register of the enhanced VM according to the embodiment of the present invention. Accordingly, two commands LOAD/STORE in the conventional Java VM are combined into one command "MOVE" between the virtual registers in the enhanced VM according to the embodiment of the present invention. Further, since data is not moved between memories but is moved between registers in the above-described process, performance of the VM can be improved. In the embodiment of the present invention, the above-described translation process is performed in the class/dex translator 261 shown in FIG. 3.

Figure 11:
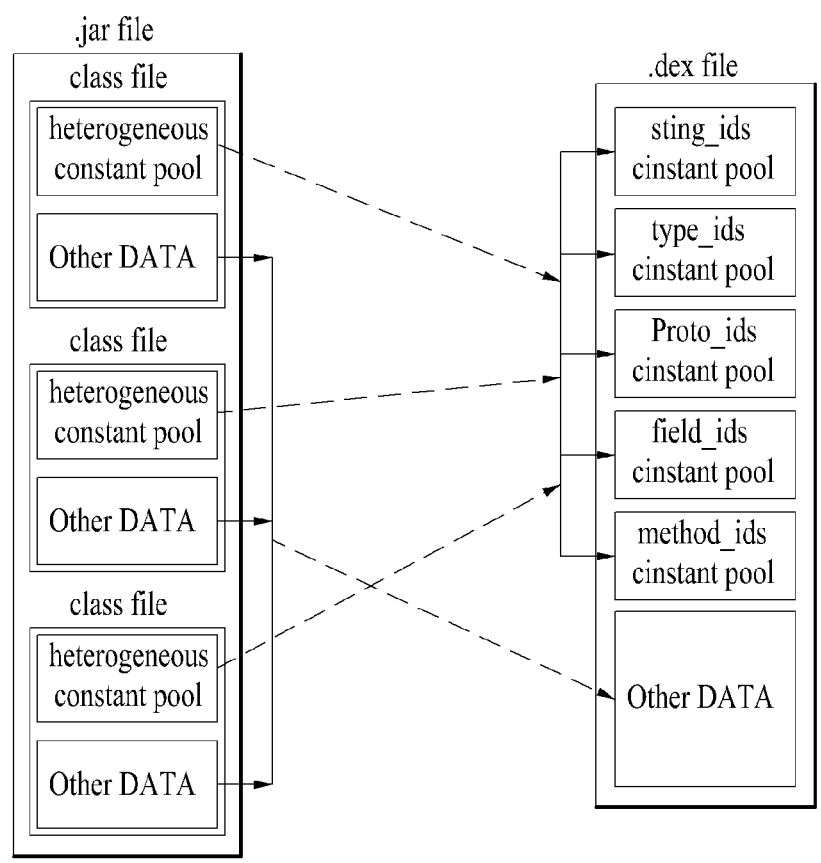
FIG. 11 is a diagram showing a process of sharing a constant pool by an enhanced VM according to an embodiment of the present invention.

FIG. 11 is a diagram showing a process of sharing a constant pool by an enhanced VM according to an embodiment of the present invention. FIG. 12 is a diagram illustrating a result of reducing footprint according to the sharing process of FIG. 11. Hereinafter, the result of improving memory use efficiency if the enhanced VM according to the embodiment of the present invention is designed to share the constant pool will be described with reference to FIGS. 11 and 12.

First, as shown in the left of FIG. 11, a Java application received by a display apparatus according to an embodiment of the present invention includes a plurality of class files. Further, each class file includes a constant pool and other data.

In a process of translating a plurality of class files into one dex file by the class/dex translator 261 shown in FIG. 3, the constant pool and the other data are shared as shown in the right of FIG. 11.

In the case of using a constant pool sharing method shown in FIG. 11, it can be seen that footprint is remarkably reduced through experimentation, as shown in FIG. 12.

For example, with respect to common system libraries, the uncompressed java class file uses 21,445,320 bytes and the compressed java class file uses 10,662,048 bytes. In contrast, the dex file uses only 10,311,972 bytes even in a state of being uncompressed and the size of the dex file is reduced as compared to the size of the compressed java class file.

In addition, with respect to a web browser application, the uncompressed java class file uses 470,312 bytes and the compressed java class file uses 232,065 bytes. In contrast, the dex file uses only 209,248 bytes even in a state of being uncompressed and thus the size of the dex file is reduced as compared to the size of the compressed java class file.

In addition, with respect to an alarm check application, the uncompressed java class file uses 119,200 bytes and the compressed java class file uses 61,658 bytes. In contrast, the dex file uses only 53,020 bytes even in a state of being uncompressed and thus the size of the dex file is reduced as compared to the size of the compressed java class file.

FIG. 13 is a flowchart showing a process of translating data in class units by an enhanced VM according to an embodiment of the present invention. Hereinafter, the process of translating data in class units by the enhanced VM according to the embodiment of the present invention will be described in detail with reference to FIG. 13.

The enhanced VM 260 shown in FIG. 3 may be designed to perform steps shown in FIG. 10 or the class/dex translator 2610 may be designed to perform some steps.

First, if a file is received from a broadcast tuner, a network interface or an external device interface (S1210), it is determined whether the file is written in a specific programming language (e.g., a Java class file) (S1220). If it is determined that the file is not written in the Java class file (S1220), the received file is executed without translation (S1230).

In contrast, if it is determined that the file is written in the Java class file (S1220), a process S1240 of loading the class file and a process S1250 of translating the loaded class file into a dex file format are performed. Steps S1240 and S1250 will now be described in greater detail.

Step S1240 includes steps S1241, S1242, S1243 and S1244. First, a header of the received class file is loaded (S1241), a constant pool of the class file is loaded (S1242), class information of the class file is loaded (S1243), and an interface/field/method of the class file is loaded (S1244). After the above-described load process S1240 is performed, translation into the dex format is possible.

Step S1250 includes steps S1251, S1252, S1253, S1254 and S1255. First, an ID and data of the class file located in step S1240 are translated (S1251), and the translated ID and data are sorted (S1252). Further, def information of the loaded class file is translated (S1253) and the translated class def information is sorted (S1254). If the above-described translating and sorting processes are finished, the dex file is written in the dex format (S1255).

If steps S1240 and S150 are finished, the class file may be executed in the dex format (S1230).

Figure 14:
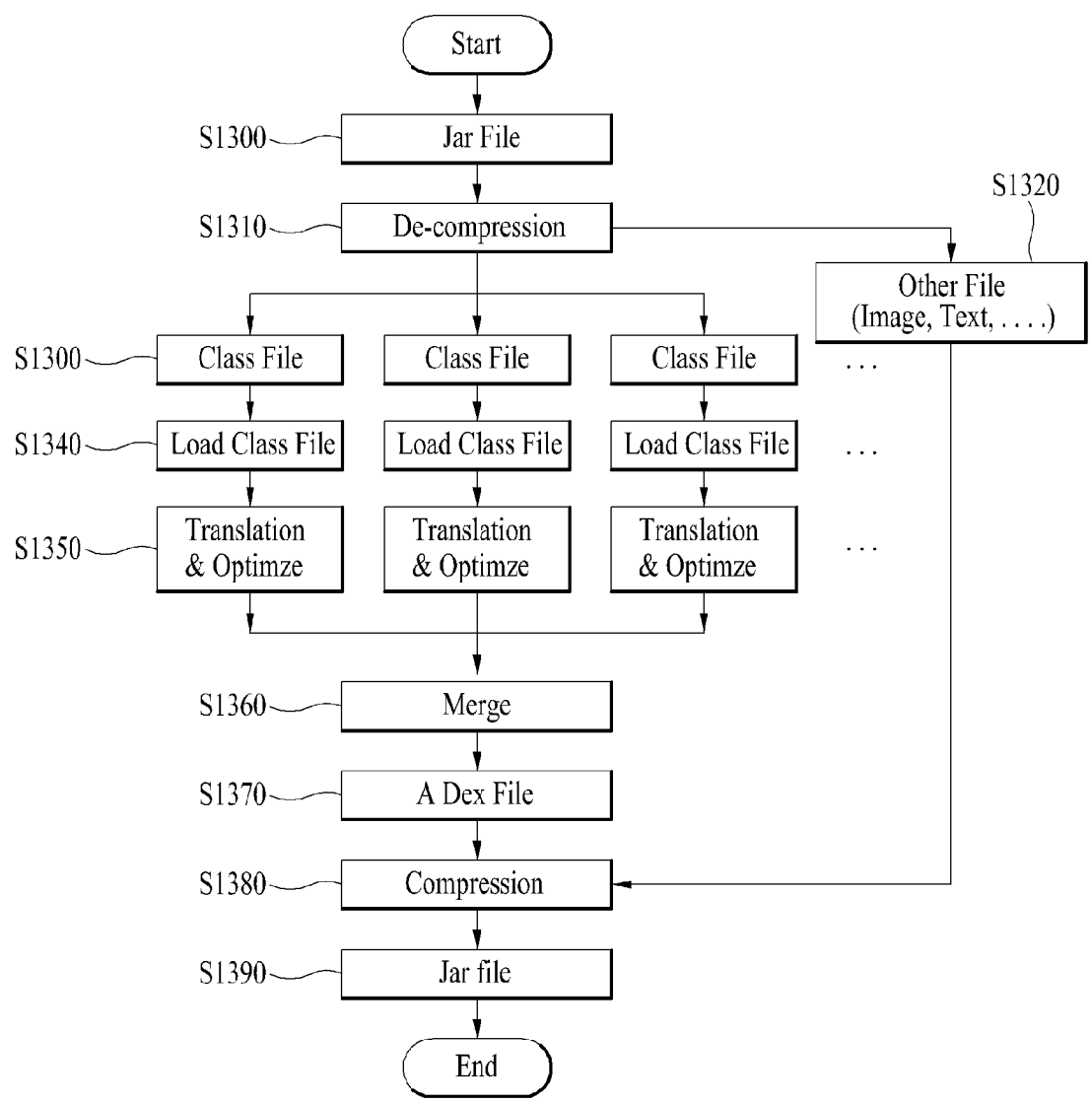
FIG. 14 is a flowchart illustrating a process of translating data in full package units using an enhanced VM according to an embodiment of the present invention.

FIG. 14 is a flowchart illustrating a process of translating data in full package units using an enhanced VM according to an embodiment of the present invention. Hereinafter, the process of translating data in full package units using the enhanced VM according to the embodiment of the present invention will be described in detail with reference to FIG. 14. The embodiment shown in FIG. 14 is different from the embodiment shown in FIG. 13 in that a plurality of Java class files configuring a received application is decompressed and is processed at once.

First, if a Java application file composed of a plurality of class files is received (S1300), each compressed class file is decompressed (S1310).

The class files extracted in step S1310 are subjected to steps S1330, S1340 and S1350. Among the files extracted in step S1310, files other than the class file are separately processed (S1320). The other files correspond to, for example, images, text, etc.

If any class file among the plurality of extracted class files is received (S1330), a process of loading the received class file is performed (S1340). Then, the process of translating the loaded class file into the dex format is performed (S1350). In addition, an optimization process may be additionally performed.

As the optimization process, for example, copy propagation optimization, quicken optimization or string system class optimization, etc. may be used. In particular, a copy propagation optimization method will now be described.

In a step of translating Java class bytecode into a bytecode used in an enhanced VM, optimization is applied to only each basic block. For example, a java operand stack does not have a specific value upon start and end of a basic block. Accordingly, copy propagation optimization does not need to be applied to the case of exceeding a basic block unit. In this case, it is possible to more rapidly apply optimization.

The plurality of class files subjected to steps S1330, S1340 and S1350 are merged (S1360) so as to generate one dex file (S1370). The other files processed in step S1320 and the dex file generated in step S1370 are compressed (S1380) so as to restore the Java application file.

Figure 15:
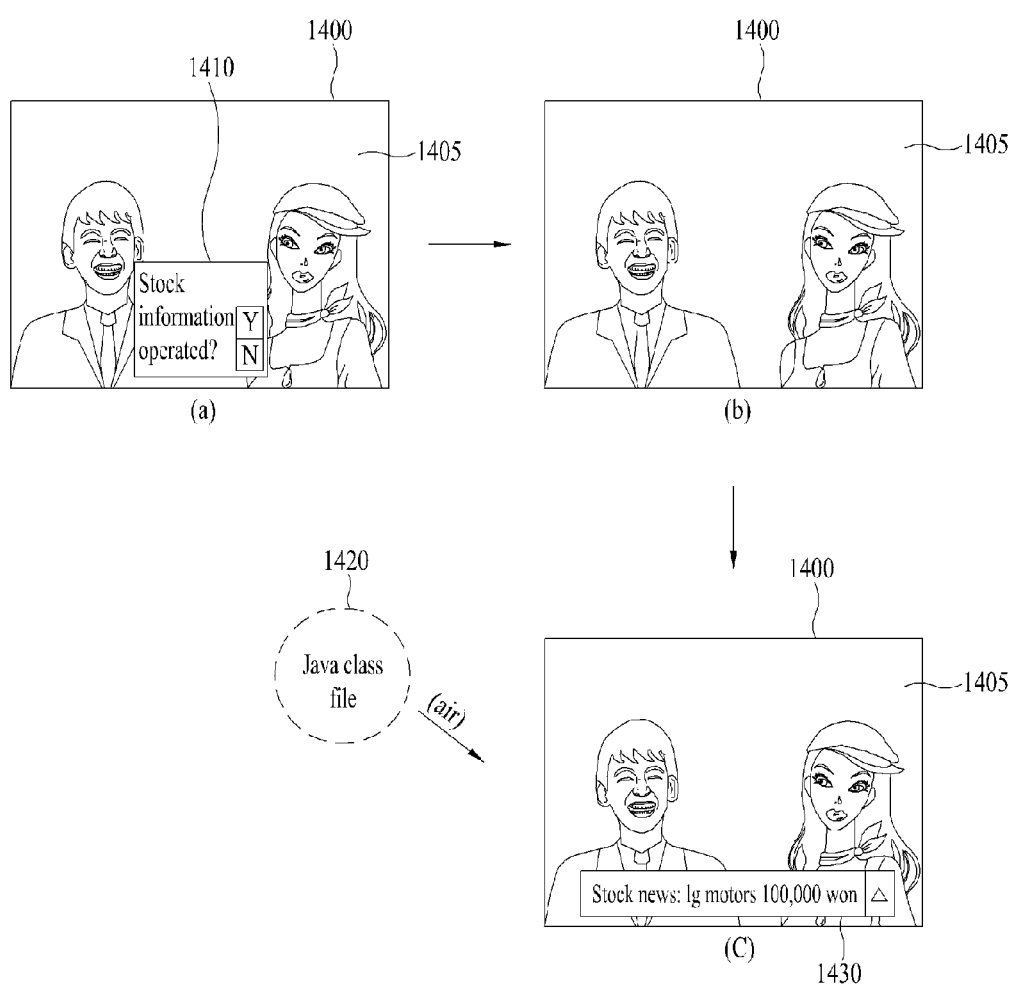
FIG. 15 is a diagram showing an example of a user interface of a display apparatus having an enhanced VM according to an embodiment of the present invention.

FIG. 15 is a diagram showing an example of a user interface of a display apparatus having an enhanced VM according to an embodiment of the present invention. Hereinafter, the user interface in the case in which the display apparatus having the enhanced VM according to the embodiment of the present invention receives an application over the air will be described with reference to FIG. 15.

The display apparatus 1400 shown in FIG. 15 corresponds to the apparatus shown in FIG. 7, for example, and may further include the controller shown in FIG. 8. Further, it is assumed that the display apparatus 1400 includes the enhanced VM shown in FIG. 3. In particular, in the related art, a Java class file in all data (e.g., subtitles, headlines, stock news, etc.) transmitted in real time may not be translated into a dex format in advance. Hereinafter, a method of solving the problem wherein data broadcast of a Java class file transmitted in real time cannot be processed will be described with reference to FIG. 15 (refer to FIGS. 3, 7 and 8).

First, as shown in FIG. 15(a), the display apparatus 1400 according to the embodiment of the present invention outputs video data 1405 received over a broadcast network. At this time, a guide message 1410 asking whether or not a data broadcast (e.g., a Java application) received over the broadcast network is output. The guide message 1410 is generated by the OSD generator of the controller shown in FIG. 8. Only the processes of FIGS. 15(b) and 15(c) may be performed without performing the process of FIG. 15(a), which may fall within the scope of the present invention.

If the data broadcast is not received over the broadcast network, as shown in FIG. 15(b), the display apparatus 1400 continues to display only the video data 1405 corresponding to a general broadcast program.

Meanwhile, if the data broadcast (e.g., a Java class file) 1420 is received over the broadcast network, as shown in FIG. 15(c), the display apparatus 1400 outputs not only the video data 1405 corresponding to the general broadcast program but also data 1430 corresponding to the data broadcast composed of the Java class file. Further, the process of translating the Java class file 1420 into a format capable of being processed by the VM is performed by the class/dex translator 261 shown in FIG. 3.

In summary, the display apparatus including the VM 260 shown in FIG. 3 receives a data broadcast transmitted in real time. The class/dex translator 261 shown in FIG. 3 translates a first data format (e.g., a Java class file) included in the data broadcast into a second data format (e.g., a dex format) capable of being processed by the VM.

After the VM processes the second data format, the controller 170 shown in FIG. 7 translates the second data format processed by the VM into outputtable data. For example, the data may be processed by a video display processor (VDP) included in the controller 170 or a separate VDP module.

Accordingly, as shown in FIG. 15(*c*), the video information of the data broadcast transmitted in real time is displayed in a specific region 1430.

Figure 16:
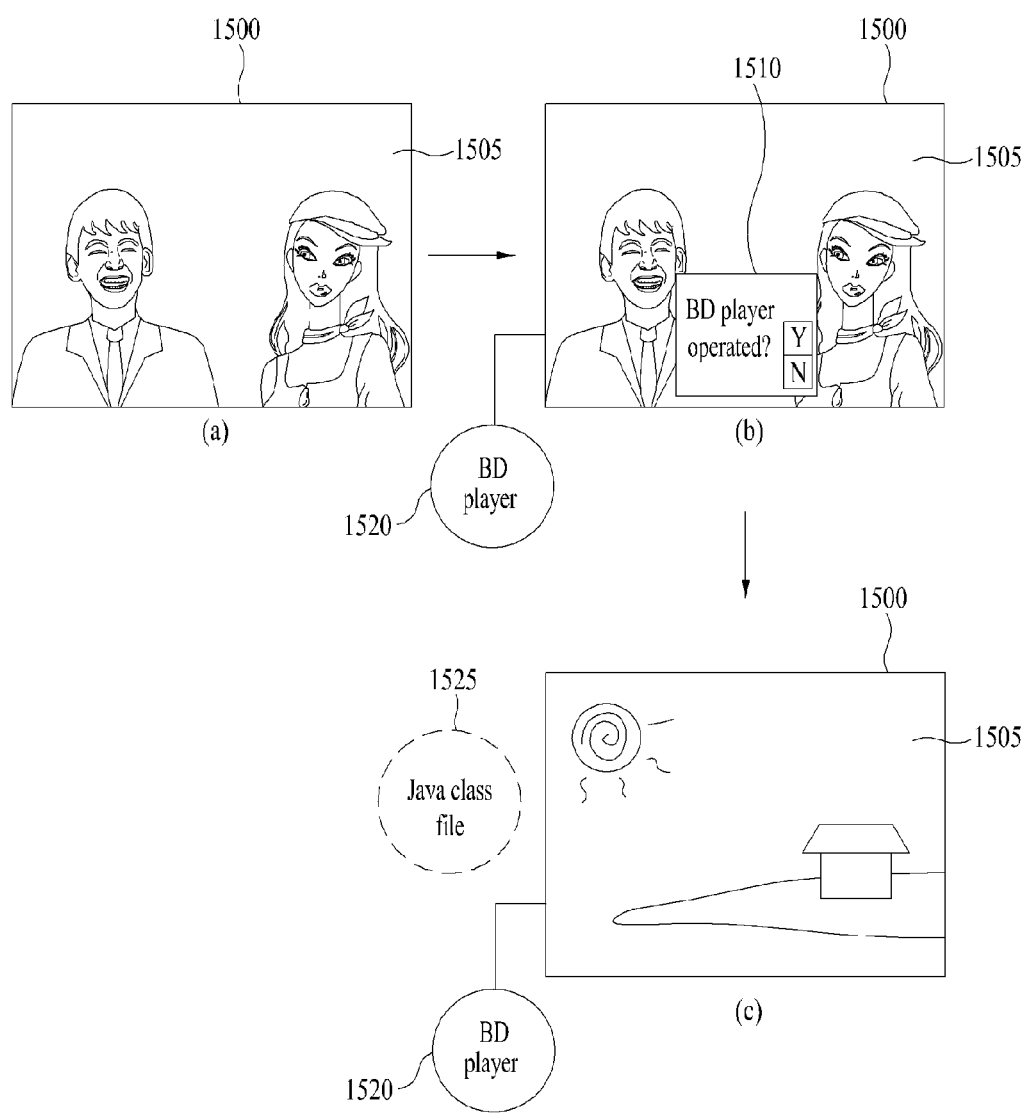
FIG. 16 is a diagram showing another example of a user interface of a display apparatus having an enhanced VM according to an embodiment of the present invention.

FIG. 16 is a diagram showing another example of a user interface of a display apparatus having an enhanced VM according to an embodiment of the present invention. Hereinafter, the user interface in the case in which the display apparatus having the enhanced VM according to the embodiment of the present invention receives an application through an external device (e.g., a BD player) will be described with reference to FIG. 16.

The display apparatus 1500 shown in FIG. 16 corresponds to the apparatus shown in FIG. 7, for example, and may further include the controller shown in FIG. 8. Further, it is assumed that the display apparatus 1500 includes the enhanced VM shown in FIG. 3.

First, as shown in FIG. 16(*a*), the display apparatus 1500 according to the embodiment of the present invention outputs video data 1405 received over a broadcast network.

Further, if an external device 1520 is connected through an external device interface, as shown in FIG. 16(*b*), the display apparatus 1500 outputs a guide message 1510 asking whether the external device is operated. The guide message 1510 is generated by the OSD generator of the controller shown in FIG. 8. The step of outputting the message 1510 in FIG. 16(*b*) may be omitted, which may fall within the scope of the present invention.

Meanwhile, if a Java class file 1525 is received from the external device 1520, as shown in FIG. 16(*c*), the display apparatus 1500 outputs a graphic 1515 corresponding to data composed of the Java class file. The process of translating the Java class file 1525 into a format capable of being processed by the VM is described with reference to FIG. 3 and thus a description thereof will be omitted.

Figure 17:
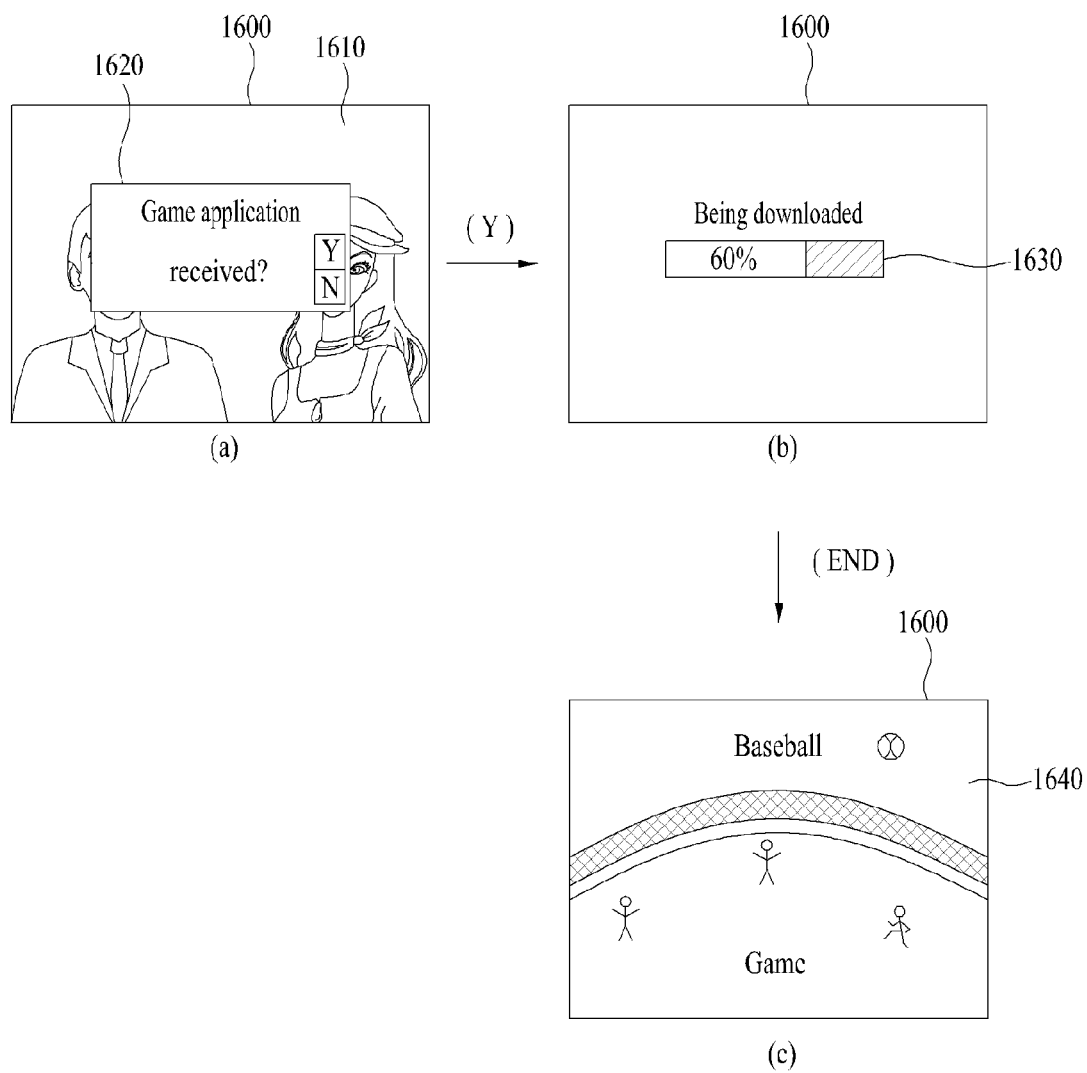
FIG. 17 is a diagram showing another example of a user interface of a display apparatus having an enhanced VM according to an embodiment of the present invention.

FIG. 17 is a diagram showing another example of a user interface of a display apparatus having an enhanced VM according to an embodiment of the present invention. Hereinafter, the user interface in the case in which the display apparatus having the enhanced VM according to the embodiment of the present invention receives a Java application through an Internet network will be described with reference to FIG. 17.

The display apparatus 1600 shown in FIG. 17 corresponds to the apparatus shown in FIG. 7, for example, and may further include the controller shown in FIG. 8. Further, it is assumed that the display apparatus 1600 includes the enhanced VM shown in FIG. 3.

First, as shown in FIG. 17(*a*), the display apparatus according to the embodiment of the present invention accesses a specific server over an internet network and outputs a guide message 1620 asking whether a specific application is received from the accessed server.

In the guide message 1620 shown in FIG. 17(*a*), if yes is selected via the user interface, as shown in FIG. 17(*b*), an OSD 1630 indicating a state in which a specific application (e.g., a game-related Java application) received over the Internet network is being received is displayed.

If the Java application is completely downloaded and stored in a memory, a screen in which the application is executed is output according to the operation of the enhanced VM, as shown in FIG. 17(*c*).

Only the step of FIG. 17(*a*) and the step of FIG. 17(*c*) may be performed without performing the step of FIG. 17(*b*), which may fall within the scope of the present invention.

Figure 18:
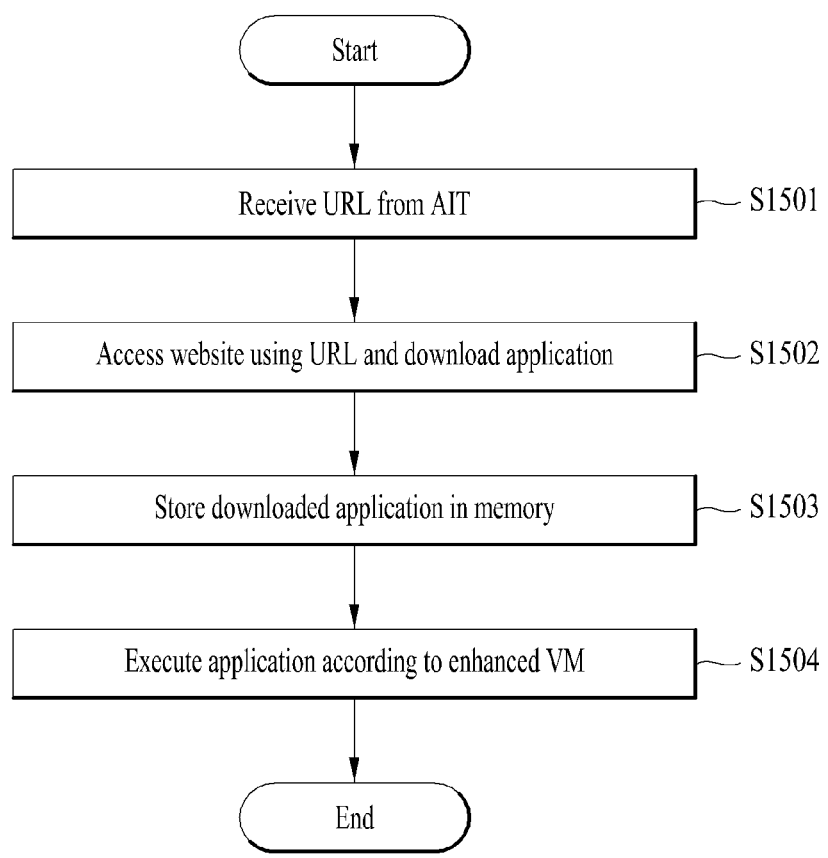
FIG. 18 is a flowchart illustrating a process of implementing the user interface shown in FIG. 17.

FIG. 18 is a flowchart illustrating a process of implementing the user interface shown in FIG. 17. Hereinafter, the process of implementing the user interface shown in FIG. 17 will be described with reference to FIG. 18.

The display apparatus according to the embodiment of the present invention extracts uniform resource locator (URL) information from an application information table (AIT) received over a broadcast network (S1501).

Then, the display apparatus automatically accesses a website using the URL information extracted in step S1501 and downloads a specific application (e.g., data written in Java language) (S1502).

In addition, the display apparatus stores the application downloaded in step S1502 in a memory (e.g., a flash memory) (S1503). Then, the display apparatus executes the Java application according to the enhanced VM previously stored in the memory (S1504). The process of translating the data format using the enhanced VM is described above and thus a description thereof will be given.

Further, although the present invention is described using respective drawings for convenience of description, the embodiments shown in the drawings may be combined to implement a new embodiment. As needed, a computer-readable recording medium having recorded thereon a program for implementing the above-described embodiments may fall within the scope of the present invention.

The image display apparatus and the method for operating the same according to the foregoing exemplary embodiments are not restricted to the exemplary embodiments set forth herein. Therefore, variations and combinations of the exemplary embodiments set forth herein may fall within the scope of the present invention.

The method of operating the display apparatus according to the present invention may be implemented as code that can be written on a computer-readable recording medium and can thus be read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

Although the exemplary embodiments of the present invention have been described above, the present invention is not limited to the above-described embodiments. It will be apparent to those skilled in the art that various modifications and variations can be made in the present invention without departing from the spirit or scope of the inventions. Such medications and variations are not construed as departing from the technical spirit of the present invention.

Both the product invention and the process invention are described in the specification and the description of both inventions may be supplementarily applied as needed.

What is claimed is:

1. A hybrid broadcast broadband television (HBBTV) having a virtual machine, comprising:

a receiver configured to receive an application written in a Java programming language, wherein a mobile device is connected to the HBBTV and transmits the application written in the Java programming language;

a detector configured to detect a first data format included in the application;

a translator configured to translate in real time, the detected first data format into a second data format capable of being processed by an enhanced virtual machine;

a mixer configured to mix the translated second data format with the first data format;

a formatter configured to change the mixed data format to displayable data; and a display configured to output the displayable data formatted by the formatter, wherein the enhanced virtual machine sequentially decompresses the first data format composed of at least two class files, then performs a loading, translating and optimizing process with respect to the class files in real time, then merges the class files subjected to the loading, translating and optimizing process into a single Dex file so as to generate the second data format, and compresses the single Dex file to restore a Java application file, wherein the loading, translating and optimizing process is simultaneously performed on the at least two class files in translating the first data format to the second data format, and the optimization process included in the loading, translating and optimization process includes quicken optimization and string system class optimization, wherein the display displays a selectable message to a user for receiving the application based on the generated second data format and when the user accepts receiving the application, the application is downloaded by extracting uniform resource locator (URL) information from an application information table (AIT) received over a broadcast network to automatically access a website using the extracted URL information, and the display not only outputs video data corresponding to a general broadcast program but also outputs video data corresponding to data broadcast composed of a Java class file received over the air via the receiver, and wherein the translator is included in the enhanced virtual machine.

2. The HBBTV of claim 1, wherein the enhanced virtual machine generates the second data format sharing a constant pool included in each class file of the first data format.

3. The HBBTV of claim 1, wherein the receiver receives data including a Java application over the air or through an external device.

4. The HBBTV of claim 1, wherein the first data format corresponds to the Java class file, and the second data format corresponds to a dex file format.

* * * * *